United States Patent
Gopinath et al.

(10) Patent No.: US 11,226,479 B2
(45) Date of Patent: Jan. 18, 2022

(54) ELECTROWETTING PRISM FOR SCANNING IN HIGH RESOLUTION FLUORESCENCE MICROSCOPY

(71) Applicant: THE REGENTS OF THE UNIVERSITY OF COLORADO, Denver, CO (US)

(72) Inventors: Juliet T. Gopinath, Boulder, CO (US); Victor M. Bright, Boulder, CO (US); Omkar D. Supekar, Boulder, CO (US); Wei Yang Lim, Boulder, CO (US); Mo Zohrabi, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 0 days.

(21) Appl. No.: 16/413,395

(22) Filed: May 15, 2019

(65) Prior Publication Data
US 2019/0353892 A1 Nov. 21, 2019

Related U.S. Application Data

(60) Provisional application No. 62/720,696, filed on Aug. 21, 2018, provisional application No. 62/717,788, filed on May 15, 2018.

(51) Int. Cl.
*G01N 21/64* (2006.01)
*G02B 26/00* (2006.01)
(Continued)

(52) U.S. Cl.
CPC ....... *G02B 26/005* (2013.01); *G01N 21/6458* (2013.01); *G02B 3/12* (2013.01); *G02B 21/0076* (2013.01); *G02B 26/02* (2013.01)

(58) Field of Classification Search
CPC .... G02B 26/005; G02B 3/12; G02B 21/0076; G02B 26/02; G02B 26/0891;
(Continued)

(56) References Cited

U.S. PATENT DOCUMENTS

| 8,208,146 B2 * | 6/2012 | Srinivasan | G01N 21/0303 356/432 |
| 2012/0080616 A1 * | 4/2012 | Schoenborn | A61B 5/0062 250/459.1 |

(Continued)

OTHER PUBLICATIONS

Author: Omkar et al., Title: Two-photon laser scanning microscopy with electrowetting-based prism scanning, Date:Dec. 2017, Publisher: Biomedical Optics Express (Year: 2017).*
(Continued)

*Primary Examiner* — Kiho Kim
(74) *Attorney, Agent, or Firm* — Saul Ewing Arnstein & Lehr LLP; Kathryn Doyle; Domingos J. Silva

(57) ABSTRACT

A system for high resolution multiphoton excitation microscopy is described herein. In one embodiment, the system may include an electrowetting on dielectric (EWOD) prism optically coupled to an excitation source, the EWOD prism adapted or configured to: receive a light beam from the excitation source, and project the received light beam onto a sample plane based on a tunable transmission angle of the EWOD prism, and a fluorescence imaging microscope adapted or configured to: receive a fluorescence signal from the sample plane based on the projected light beam, and relay the fluorescence signal from the sample plane to a set of detectors.

20 Claims, 14 Drawing Sheets

(51) Int. Cl.
*G02B 3/12* (2006.01)
*G02B 21/00* (2006.01)
*G02B 26/02* (2006.01)

(58) Field of Classification Search
CPC .............. G02B 21/0036; G02B 26/108; G02B 21/0032; G01N 21/6458
USPC ...................................................... 250/458.1
See application file for complete search history.

(56) References Cited

U.S. PATENT DOCUMENTS

| | | | |
|---|---|---|---|
| 2013/0181143 A1* | 7/2013 | Betzig ................ | G02B 21/0032 250/459.1 |
| 2015/0069268 A1* | 3/2015 | Schoenborn ....... | G01N 21/6486 250/459.1 |
| 2017/0010456 A1* | 1/2017 | Gopinath ............. | G02B 23/243 |
| 2017/0218416 A1* | 8/2017 | Arlow ................ | C12N 15/1093 |

OTHER PUBLICATIONS

Author: Soraya et al., Title: Adaptive electrowetting lens-prism element, Date:2015, Publisher:Optical Society of America (Year: 2015).*

Author: Lidija et al., Title: Two-dimensional droplet-based surface plasmon resonance imaging using electrowetting-on-dielectric microfluidics, Date:Nov. 2008, Publisher:The Royal Society of Chemistry (Year: 2008).*

Chen et al., "Annealing effect of niobium pentoxide for low voltage electrowetting on dielectric (EWOD)", 2011, 6th International Microsystems, Packaging, and Circuits Technology Conference, 3 pages. (Year: 2011).*

Berge, et al., "Variable focal lens controlled by an external voltage: An application of electrowetting", Eur. Phys. J. E 3, 2000, 159-163.

Bird, et al., "Two-photon fluorescence endoscopy with a micro-optic scanning head", Opt. Lett. 28, 2003, 1552-1554.

Bocarsly, et al., "Minimally invasive microendoscopy system for in vivo functional imaging of deep nuclei in the mouse brain", Biomed. Opt. Express 6, 2015, 4546-4556.

Chen, et al., "Ultrasensitive fluorescent proteins for imaging neuronal activity", Nature 499, 2013, 295-300.

Denk, et al., "Two-photon laser scanning fluorescence microscopy", Science 248, 1990, 73-76.

Gobel, et al., "Miniaturized two-photon microscope based on a flexible coherent fiber bundle and a gradient-index lens objective", Opt. Lett. 29, 2004, 2521-2523.

Hayes, et al., "Video-speed electronic paper based on electrowetting", Nature 425, 2003, 383-385.

Helmchen, et al., "A miniature head-mounted two-photon microscope", Neuron 31, 2001, 903-912.

Helmchen, et al., "Deep tissue two-photon microscopy", Nat Meth 2, 2005, 932-940.

Helmchen, F., "Miniaturization of fluorescence microscopes using fibre optics", Exp. Physiol. 87, 2002, 737-745.

Helmchen, et al., "Miniaturization of two-photon microscopy for imaging in freely moving animals", Cold Spring Harb. Protoc., 2013, 904-913.

Kopp, et al., "Optofluidic laser scanner based on a rotating liquid prism", Appl. Opt. 55, 2016, 2136-2142.

Kuiper, et al., "Variable-focus liquid lens for miniature cameras", Appl. Phys. Lett. 85, 2004, 1128-1130.

Mugele, et al., "Electrowetting: from basics to applications", J. Phys. Condens. Matter 17, 2005, R705-R774.

Murali, et al., "Three-dimensional adaptive microscopy using embedded liquid lens", Opt. Lett. 34, 2009, 145-147.

Myaing, et al., "Fiber-optic scanning two-photon fluorescence endoscope", Opt. Lett. 31, 2006, 1076-1078.

Ozbay, et al., "Miniaturized fiber-coupled confocal fluorescence microscope with an electrowetting variable focus lens using no moving parts", Opt. Lett. 40, 2015, 2553-2556.

Preibisch, et al., "Software for bead-based registration of selective plane illumination microscopy data", Nat. Methods 7, 2010, 418-419.

Salome, et al., "Ultrafast random-access scanning in two-photon microscopy using acousto-optic deflectors", Neurosci. Methods 154, 2006, 161-174.

Sawinski, et al., "Visually evoked activity in cortical cells imaged in freely moving animals", Proc. Natl. Acad. Sci. 106, 2009, 19557-19562.

Schultz, et al., "Advances in two-photon scanning and scanless microscopy technologies for functional neural circuit Imaging", Proc. IEEE 105, 2017, 139-157.

Shahini, et al., "Toward individually tunable compound eyes with transparent graphene electrode", Bioinspir. Biomim. 12, 2017, 46002.

Shahini, et al., "Versatile miniature tunable liquid lenses using transparent graphene electrodes", Langmuir 32, 2016, 1658-1665.

Smith, et al., "Agile wide-angle beam steering with electrowetting microprisms", Opt. Express 14, 2006, 6557-6563.

Supekar, et al., "Enhanced response time of electrowetting lenses with shaped input voltage functions", Langmuir 33, 2017, 4863-4869.

Svoboda, et al., "Principles of two-photon excitation microscopy and its applications to neuroscience", Neuron 50, 2006, 823-839.

Takei, et al., "Angle-tunable liquid wedge prism driven by electrowetting", J. Microelectromechanical Syst. 16, 2007, 1537-1542.

Terrab, et al., "Adaptive electrowetting lens-prism element", Opt. Express 23, 2015, 25838-25845.

Warger, et al., "Dual-wedge scanning confocal reflectance microscope", Opt. Lett. 32, 2007, 2140-2142.

Yang, et al., "In vivo imaging of neural activity", Nat. Methods 14, 2017, 349-359.

Zohrabi, et al., "Wide-angle nonmechanical beam steering using liquid lenses", Opt. Express 24, 2016, 23798-23809.

Zong, et al., "Fast high-resolution miniature two-photon microscopy for brain imaging in freely behaving mice", Nat. Methods 14, 2017, 713-719.

\* cited by examiner

700

ELECTROWETTING PRISM FOR SCANNING IN HIGH RESOLUTION FLUORESCENCE MICROSCOPY

CROSS-REFERENCE TO RELATED APPLICATION(S)

This application claims priority to U.S. Provisional Patent Application Ser. No. 62/671,788 filed May 15, 2018 and to U.S. Provisional Patent Application Ser. No. 62/720,696 filed Aug. 21, 2018. The entire content of these applications are hereby incorporated by reference herein.

STATEMENT REGARDING FEDERALLY SPONSORED RESEARCH OR DEVELOPMENT

This invention was made with government support under grant numbers: CBET1631704 and DBI1353757 awarded by the National Science Foundation; grant number N00014-15-1-2739 awarded by the Office of Naval Research. The government has certain rights in the invention.

BACKGROUND OF THE INVENTION

An important component of high resolution microscopes is a scanner for the light source, in order to build up an image. Standard microscopes utilize mirrors controlled by moving magnet galvanometers (galvo mirrors). Raster scanning through galvo mirrors is achieved by driving two mirrors in orthogonal rotation axes, with one of the mirrors assigned to the fast axis while the other scans the slow axis. The fast axis scanner can also be used in resonance mode with kHz range resonance frequencies to reduce the imaging scan time. Additional transmissive laser scanning techniques such as Risley prisms, and acousto-optic beam deflectors have also been demonstrated for high resolution microscopy. However, with growing interest in miniature microscopes (e.g., for in vivo neuronal imaging, etc.), there is room for developing alternative technology that can be integrated into the microscope objective to provide lateral and axial laser scanning.

SUMMARY

One aspect of the invention provides for a system for high resolution multiphoton excitation microscopy, and is described herein. The system includes an electrowetting on dielectric (EWOD) prism optically coupled to an excitation source, the EWOD prism adapted or configured to: receive a light beam from the excitation source, and project the received light beam onto a sample plane based on a tunable transmission angle of the EWOD prism, and a fluorescence imaging microscope adapted or configured to: receive a fluorescence signal from the sample plane based on the projected light beam, and relay the fluorescence signal from the sample plane to a set of detectors.

This aspect of the invention can include a variety of embodiments.

In one embodiment, the EWOD prism further includes a cylindrical tube, at least a first electrode positioned on a first inner portion of the cylindrical tube, and at least a second electrode positioned on a second inner portion of the cylindrical tube where the at least first electrode and the at least second electrode are separated from one another based on a shadow masking process. In some cases, the EWOD prism further includes a mount coupled to the cylindrical tube; where the mount and the cylindrical tube define a cavity, and a liquid solution located within the cavity of the cylindrical tube and the mount.

In one embodiment, the liquid solution includes at least one of a sodium dodecyl sulfate solution, dodecane, deionized water, 1-phenyl-1-cyclohexene, 1,8 Dibromoctane (DBO), Diphenyltetramethyldisiloxane (DPTMDS), ECO-704 diffusion pump oil, or a combination thereof.

In one embodiment, the system further includes a power supply coupled to the EWOD prism, the power supply adapted or configured to generate a voltage difference across the EWOD prism; where the generated voltage difference alters the angle of transmission of the EWOD prism.

In one embodiment, the fluorescence imaging microscope further comprises a fiber-coupled microendoscope or a fiber-coupled two-photon excitation microscope. In one embodiment, the EWOD prism is further adapted or configured to steer the light beam in at least one of a lateral scanning configuration, an axial scanning configuration, or a combination thereof. In one embodiment, the EWOD prism is further adapted or configured to be removable and attachable to the fluorescence imaging microscope.

In one embodiment, the set of detectors are adapted or configured to generate a fluorescent image of a sample on the sample plane based on the fluorescent signal from the sample. In one embodiment, the generated fluorescent image includes an image portion of red fluorescent proteins, an image portion of green fluorescent proteins, an image portion of yellow fluorescent proteins, or a combination thereof.

Another aspect of the claimed invention provides a system for fabricating an EWOD prism, and is also described herein. The system includes a high resolution printer adapted for configured to generate a shadow mask; where the shadow mask is adapted or configured to mask a portion of a cylindrical tube prior to a depositing of a set of electrodes onto a set of sidewalls of the EWOD prism.

This aspect of the invention can include a variety of embodiments.

In one embodiment, the system includes a depositor adapted or configured to deposit the set of electrodes onto the set of sidewalls of the EWOD prism. In some cases, the depositor deposits the set of electrodes via at least one of a direct current (DC) sputtering process, a radio frequency (RF) sputtering process, a chemical vapor deposition (CVD) process, an atomic layer deposition (ALD) process, or a combination thereof.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Figure 1:
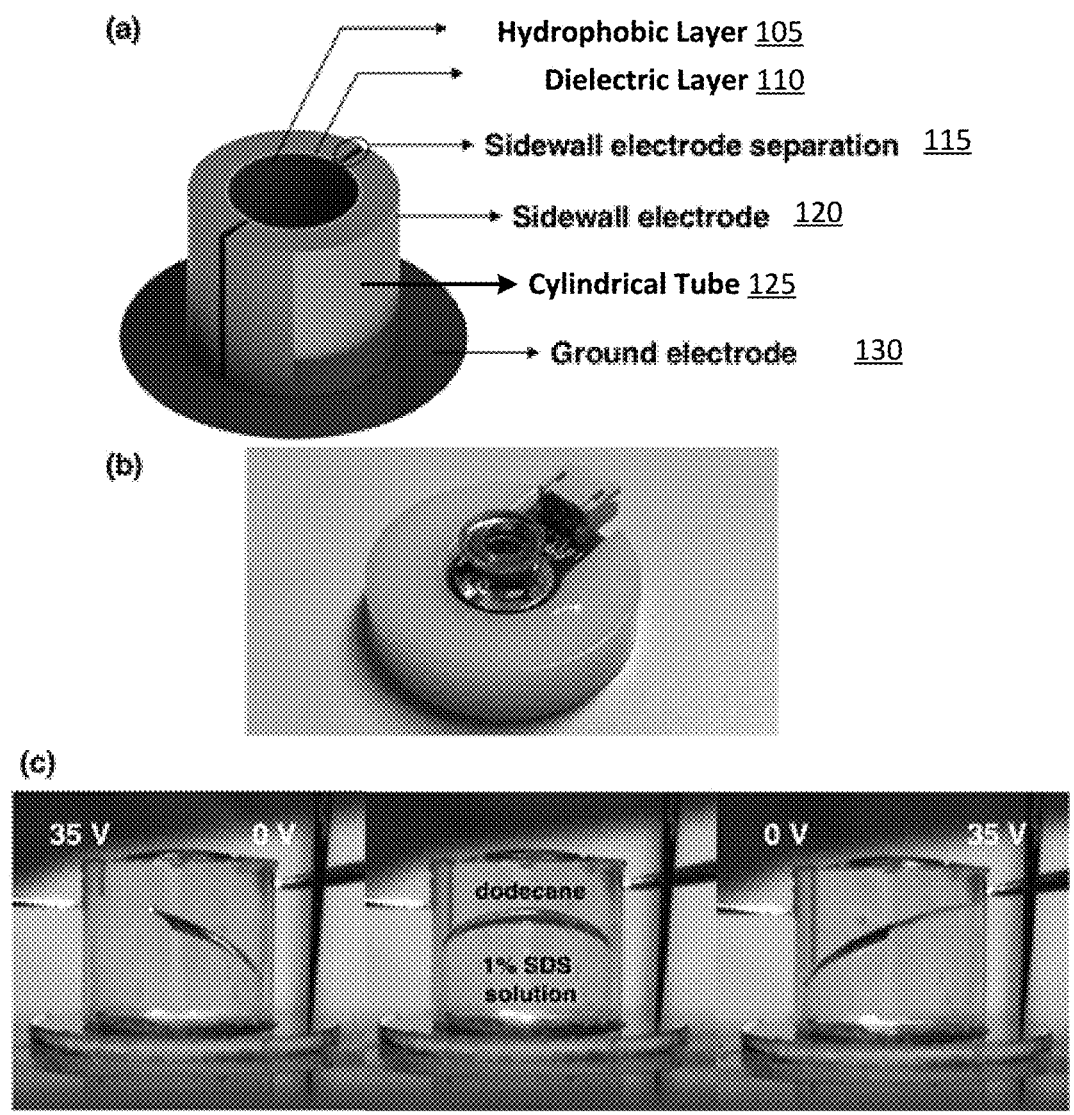
FIG. 1 depicts an electrowetting on dielectric (EWOD) device for scanning in high resolution fluorescent microscopy, according to an embodiment of the claimed invention.

Transmissive adaptive optics based on electrowetting on dielectric (EWOD) technology offer an attractive alternative to conventional scanning techniques in high resolution microscopy. EWOD technology provides for a simple solution for an adaptive lens that can allow for lateral and/or axial scanning in fluorescent microscopy. Further, as EWOD devices can be manufactured at relatively low cost, and can be operated at low cost, EWOD devices provide for a cost effective alternative to conventional scanning devices such as galvo mirrors, Risley prisms, and acousto-optic beam deflectors EWOD Prism FIG. 1 depicts an EWOD device for scanning in high resolution fluorescent microscopy, according to an embodiment of the claimed invention.

In an electrowetting device, an applied electric field changes the contact angle of a polar liquid on a substrate. The electric field is generated by applying a voltage between the polar liquid and an underlying electrode across a dielectric surface. The contact angle variation on the surface with applied voltage is given by the Lippmann-Young equation:

$$\cos\Theta = \cos\Theta_0 + (\varepsilon_0 \cdot \varepsilon_{\mathit{eff}}/2 \cdot d_{\mathit{eff}} \cdot \gamma) \cdot V^2$$

where $\theta_0$ is the initial contact angle on the surface, V is the applied voltage, and $\gamma$ is the surface tension between the polar liquid-ambient fluid interface. To maximize tuning, the initial contact angle can be increased by applying a hydrophobic layer on the dielectric. The effective relative permittivity and thickness of the dielectric and hydrophobic layer stack are given by $\varepsilon_{\mathit{eff}}$ and $d_{\mathit{eff}}$, respectively. Changing the contact angle uniformly enables a tunable spherical liquid surface that can be used as an adaptive lens, while selectively changing the contact angle on parts of the dielectric surface enables additional control of liquid profiles, such as for tunable liquid prisms.

As shown in section (a) of FIG. 1, an EWOD device can include a cylindrical tube 125, but other cases the EWOD device can include any other shape that defines an inner cavity. The cylindrical shape can be made of glass in some cases. The cylindrical tube 125 can include sidewall electrodes 120 placed on the sidewall surface of the cylindrical tube 125. In some cases, the sidewall electrodes are composed of Indium Tin Oxide (ITO). The cylindrical tube 125 can also include a dielectric layer 110 (e.g., Parylene HT) and a hydrophobic layer 105 (e.g., Teflon) along the sidewalls. The cylindrical tube 125 can be attached (e.g., bonded) to an optical window with a patterned ground electrode 130. The attached optical window/cylindrical tube combination defines a cavity within the center of the EWOD device 100. The center of the EWOD device is then filled with a polar liquid and non-polar liquid, which will be discussed in more detail below. Once filled, the open side of the cylindrical tube is capped with another optical window. Section (b) of FIG. 1 depicts a manufactured EWOD device for use in high resolution microscopy, according to an embodiment of the claimed invention.

Section (c) of FIG. 1 depicts an EWOD device while operating. The left-view depicts the EWOD device with 35 V running through the left side electrode, and 0 V running through the right side electrode. The center view depicts the EWOD device with no voltage running through any of the electrodes. The right view depicts the EWOD device with 0 V running through the left side electrode and 35 V running through the right side electrode. As can be seen in section (c), the shape of the liquid within the EWOD device can be manipulated based on the applied voltage through the sidewall electrodes. Thus, the EWOD device's focal length can be manipulated, as well as the beam angle transmitted from the EWOD device of light that enters the EWOD device.

Liquids for EWOD Device

Figure 4:
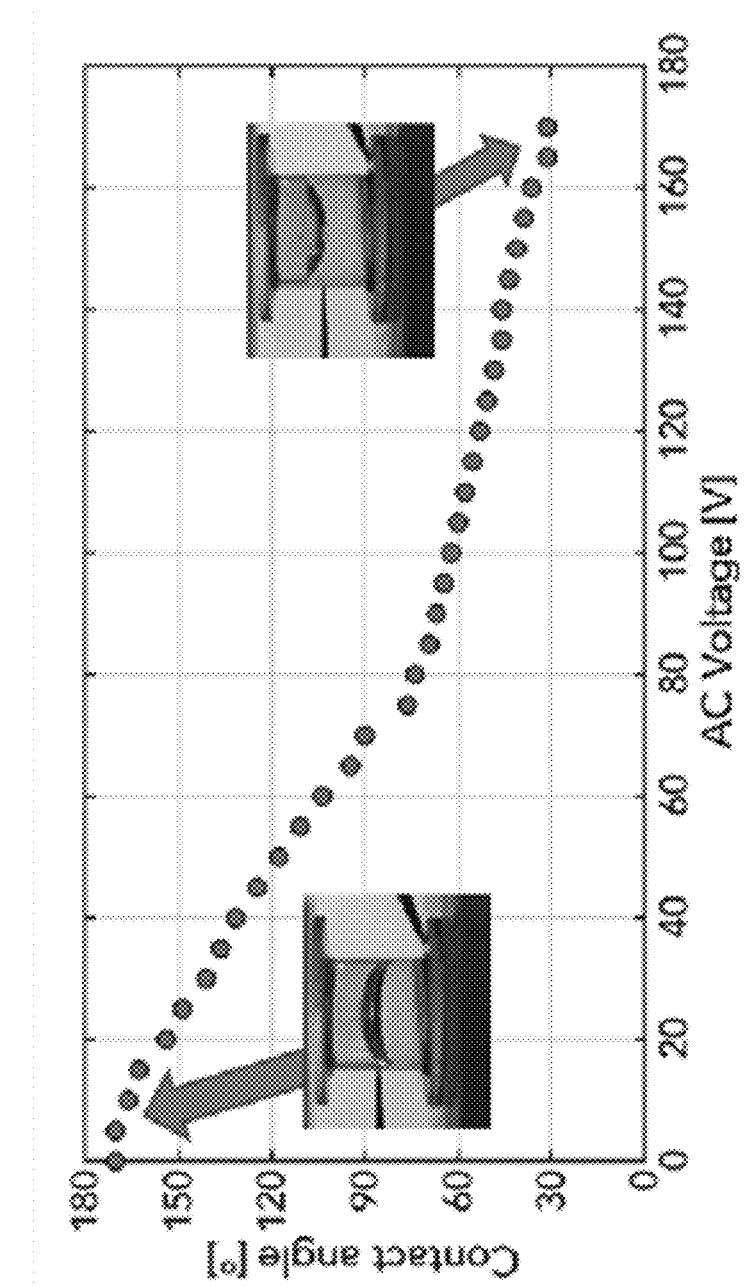
FIG. 4 depicts a graph of EWOD operation angles, according to an embodiment of the claimed invention.

The liquid system including deionized (DI) water (polar liquid), and a mixture of 1-phenyl-1-cyclohexene and dodecane (non-polar, PCH+D) provides high tunable range with contact angle variation from 170° to 30°. The non-polar liquid mixture is composed such that its density matches that of DI water (990 kg/m$^3$), making the device insensitive to orientation and motion, i.e. gravitational effect. The density matching can be achieved by mixing 1-phenyl-1-cyclohexene (PCH) with any of the following liquids (or combination of) as per requirement: 1,8 Dibromooctane (DBO), Diphenyltetramethyldisiloxane (DPTMDS), ECO-704 diffusion pump oil, and dodecane. The device actuation for this liquid system is conducted using an AC voltage signal at 2 kHz frequency. The root mean square (rms) voltage of the signal governs the contact angle variation as per the Lippmann-Young equation. FIG. 4 shows the contact angle variation of a device (1-electrode lens) with ITO sidewall electrode, a 3 µm Parylene HT dielectric layer, and Teflon hydrophobic coating.

Figure 14:
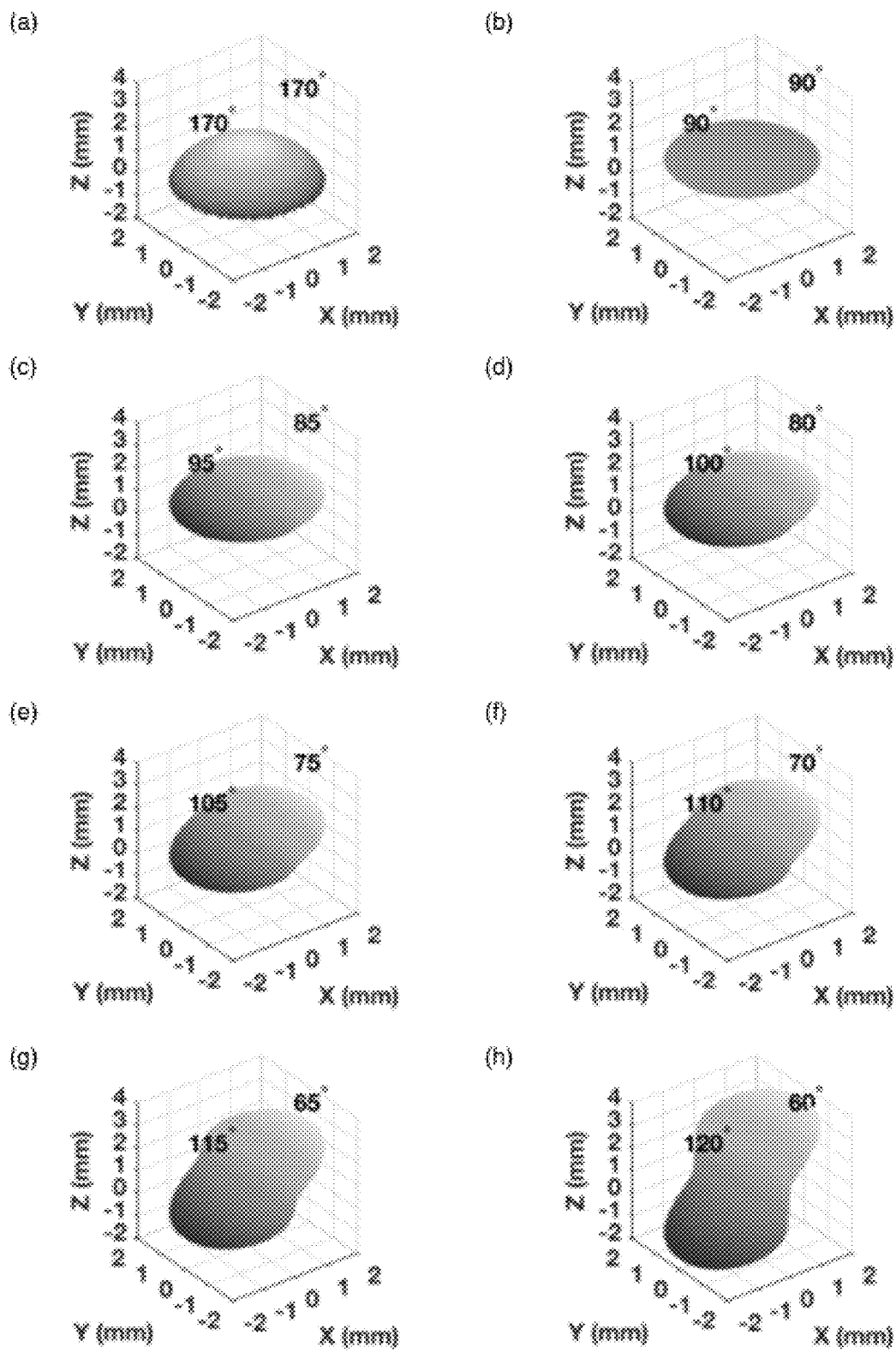
FIG. 14 depicts surface simulations graphs of an EWOD device, according to an embodiment of the claimed invention.

The wide range of contact angles made possible by the DI water/PCH+D liquid system enables the ability to generate surfaces at the liquid-liquid interface with Zernike coefficients predominantly corresponding to tilt without increasing the number of electrodes on the device for additional surface control. FIG. 14 shows surface simulation results for a 2-electrode prism for 1D beam steering application, constructed in a 4-mm ID cylindrical glass tube. Similar surfaces can be generated in a 4-electrode prism for 2D beam steering. The tilt on the surface varies from 0° to 60°, corresponding to a steering angle range from 0° to 20°, hence covering a ±20° (40° range) in one direction from the device.

Fabrication of EWOD Device

Fabrication of multi-electrode devices as adaptive scanners is enabled using a 3D printing assisted shadow masking techniques. Hollow cylindrical glass tubes (Borosilicate, soda lime, quartz etc.) with an inner diameter (ID) ranging from 2-10 mm and thickness ranging from 0.15 to 1 mm are cut to heights ranging from 0.5 to 10 mm using a diamond saw. The edges of the glass tubes are made parallel and polished to the required height dimensions (within 50 µm tolerance) by mechanically grinding the top and bottom surfaces.

Figure 7:
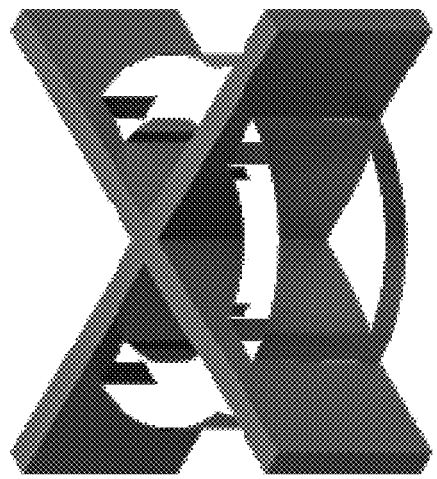
FIG. 7 depicts a shadow mask for fabricating an EWOD prism for scanning in high resolution fluorescent microscopy, according to an embodiment of the claimed invention.

The shadow mask for patterning the electrodes is 3D printed using a high-resolution printer (<200 µm, Printer: Polyjet, SLA, DLP Projection etc.). The shadow mask is designed to mask <500 µm-width strips on the vertical sidewalls of the glass tube. FIG. 7 illustrates the 3D printing assisted shadow masking 700. The number of masking strips is decided by the number of separated electrodes required for the device (e.g., 2, 3, 4, electrodes, etc.). The shadow mask is fabricated as a press fit for the glass tube. The small gaps between the shadow mask and the glass tube (if any) upon its placement is filled by the capillary action of a low viscosity resist (AZ 4210). The solvent in the resist is evaporated by thermal treatment.

The electrodes (e.g., composed of Indium Tin Oxide (ITO), Aluminum, Silver, Titanium/Gold, Chromium/Gold etc.) on the glass tube are deposited on the sidewalls using an isotropic process (e.g., direct current (DC) Sputtering, radio frequency (RF) Sputtering, Chemical Vapor Deposition (CVD), Atomic Layer Deposition (ALD) etc.) with a deposition thickness ranging from 100 to 500 nm. The dielectric layer for the device can be Parylene C, Parylene HT, Parylene AF etc., which is vapor phase deposited, or ceramic dielectrics like Aluminum oxide, Titanium dioxide, Hafnium dioxide, Silicon dioxide (or combinations of these materials) that are deposited using CVD or ALD processes. The hydrophobic coating on top of the dielectric layer can be Teflon AF or Cytop deposited using dip coating. The total thickness of this dielectric stack ranges from 1 to 5 µm.

Figure 6:
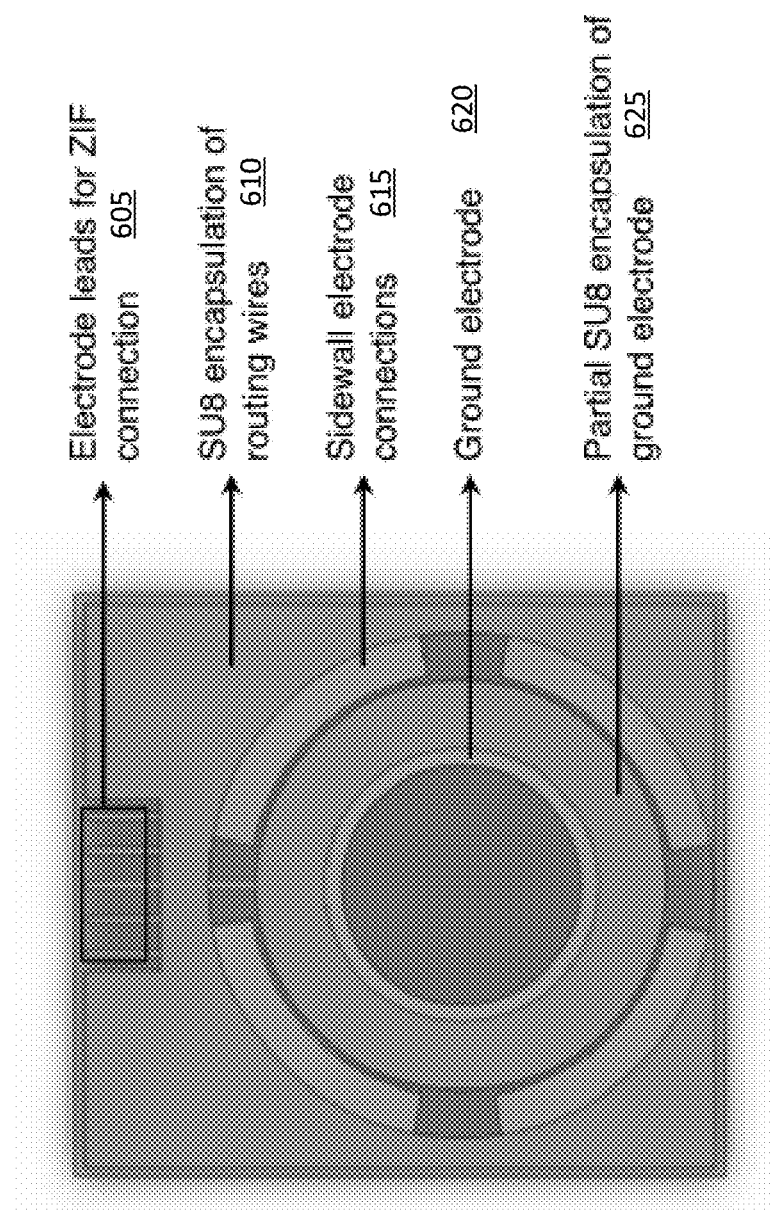
FIG. 6 depicts a view of a ground electrode for an EWOD prism for scanning in high resolution fluorescent microscopy, according to an embodiment of the claimed invention.

A diagram of a representative ground plane chip 600 is shown in FIG. 6. The ground plane electrode 620 for the device is separately patterned on a chip on a glass wafer (Material: Float Glass, Borosilicate, BK7 etc.). The ground plane 620 (Material: Titanium/Gold, Chrome/Gold) electrode of thickness ranging from 100 to 500 nm is an annular disc of ID and OD less than (250 to 500 µm) the ID and OD of the glass tube. The chip is also designed to include connections to sidewall electrodes 615 of the same layer. The connecting wires from the electrode/electrode connections are routed to the leads 605 on the chip that conform to zero insertion force (ZIF) connector standards. The electrode layer is patterned using standard lithography technique (Photoresist: NR7-1500 PY) and lift off process. The connecting wires, and part of the ground electrode annulus is covered with lithographically patterned insulator 625, such as SU8-3050. Encapsulating the routing wires 610 ensures that there is no electrical short between the electrodes due to liquid spill, and encapsulating part of the ground annulus ensures separation between the sidewall electrodes and the ground plane. The individual chips are diced from the wafer using a diamond dicing saw.

The ground electrode chip is bonded to the cylindrical glass tube with functionalized sidewalls using a screen-printed UV cured epoxy (Material: Norland UVS91). The epoxy is applied onto the region where the ground electrode is covered by SU8, ensuring a strong epoxy bond between the chip and the glass tube. The glass tube is bonded such that sidewall electrodes are aligned to the sidewall electrode connections on the chip. The electrical contact from the glass tube to the chip connection can be made through either high conductivity silver epoxy, or solder bumps from low temperature solder paste.

Exemplary EWOD Device for Microendoscope

Figure 5:
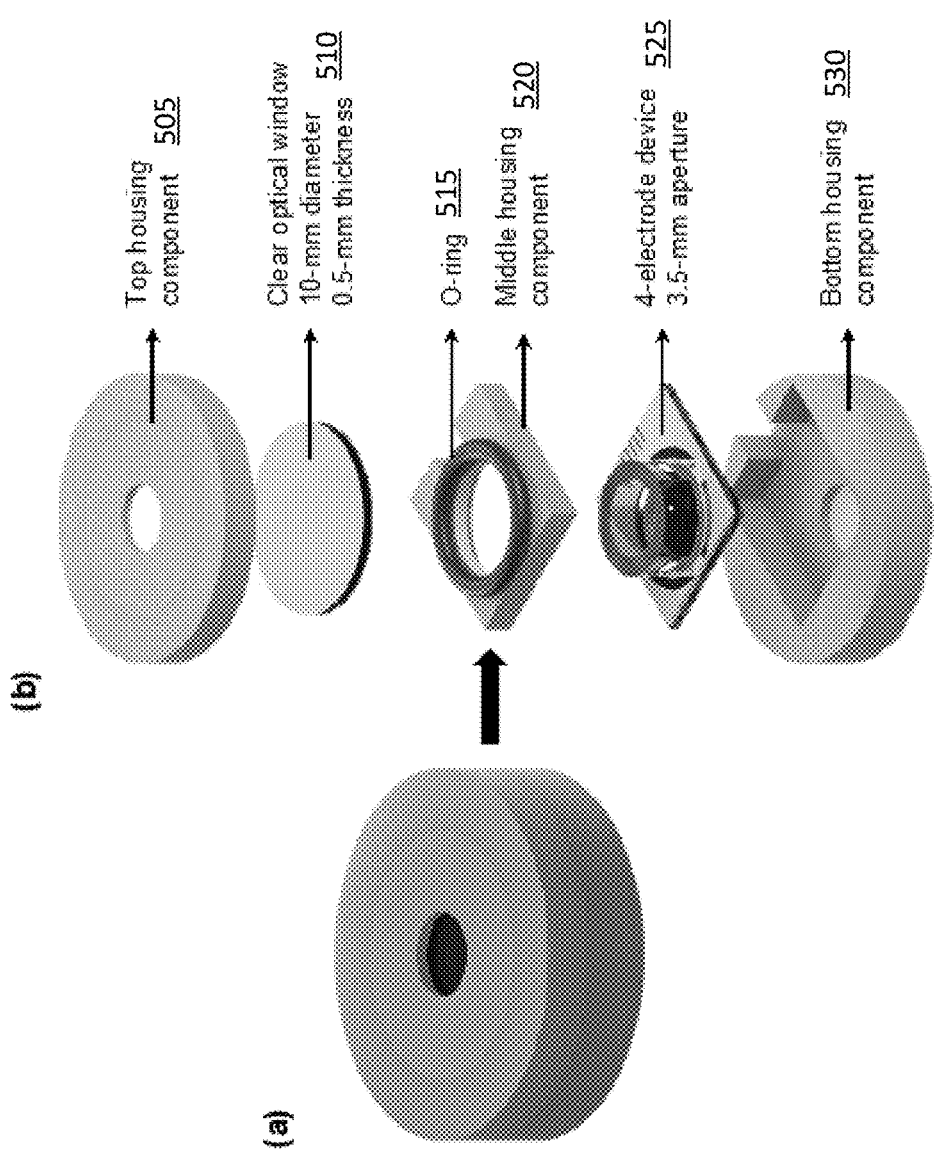
FIG. 5 depicts an EWOD configuration for scanning in high resolution fluorescent microscopy, according to an embodiment of the claimed invention.

An exemplary EWOD device for microendoscopy is described herein. The EWOD device can be an example of EWOD device 100 of FIG. 1. The EWOD can include a design and packaging of a 4-electrode electrowetting prism device 525 for integration into a microendoscope. The limitation on the package dimensions are imposed by the microendoscope objective design. The exemplary device has an aperture of 3.5-mm and constructed in a cylindrical glass tube of ID 4-mm and OD 6-mm. In order to provide a ±5° scan range from the device, the height of the glass tube is set at 2.5-mm based on the surface simulations for a 4-mm diameter device (as shown in FIG. 14). The device package is a 6-component assembly, with liquids sealed using compression packaging. The housing is 3D printed (e.g., via Polyjet, SLA, DLP Projection printers, etc.) for prototyping purposes, but can also be injection molded or machined and anodized aluminum. The housing components 505, 520, and 530 are bonded together in the assembly using a 2-part epoxy (e.g., MasterBind EP-30 epoxy, etc.). The compression seal is applied to an O-ring 515, which can be composed of Viton, Teflon coated silicone, etc., with and ID of 6-mm and thickness of 1-mm to ensure liquid encapsulation. An optical window 510 is placed between the top housing component 505 and the O-ring 515. In some cases, there can be an additional optical window placed between the 4-electrode device 525 and the bottom housing component 530. The package is cylindrical with dimensions for this design at 20-mm diameter and 4.7-mm height. The packaged device also has an aperture of 3.5-mm. FIG. 5(a) shows an illustration of the packaged device with 5(b) showing an exploded view of the assembly.

High Resolution Microscopy System

Figure 2:
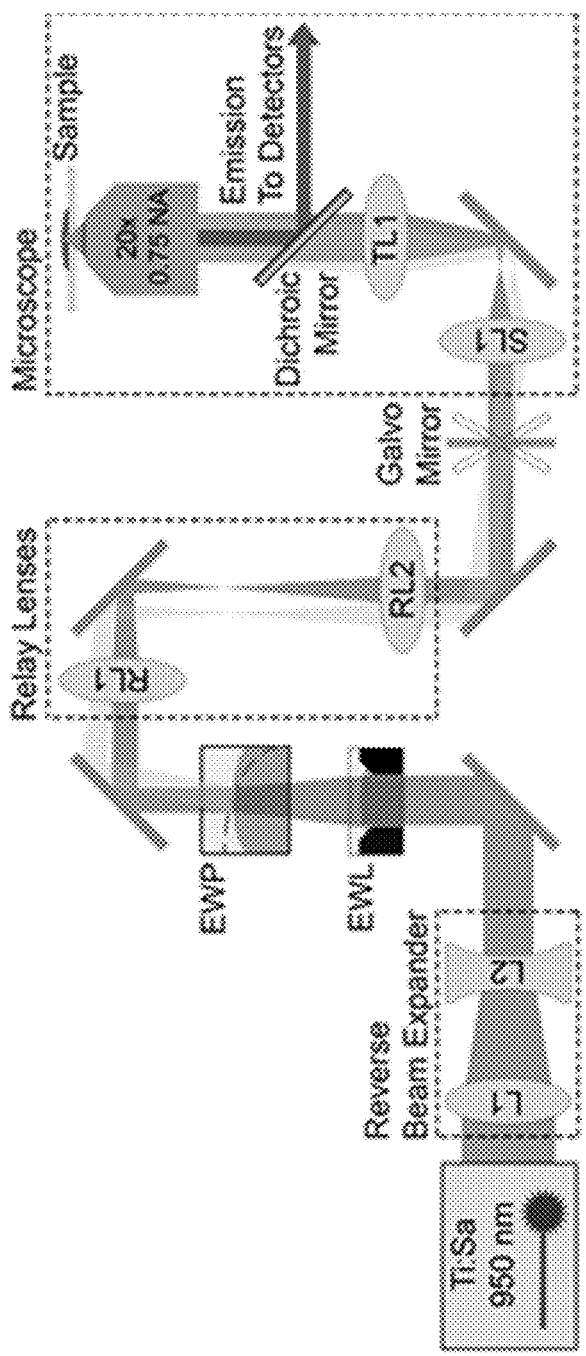
FIG. 2 depicts a system for scanning in high resolution fluorescent microscopy, according to an embodiment of the claimed invention.

FIG. 2 depicts a system 200 for scanning in high resolution fluorescent microscopy, according to an embodiment of the claimed invention.

The system 200 includes an excitation source for providing light throughout the system 200. The excitation source in some cases can be a tunable laser, which provides a collimated light beam. The transmitted light from the excitation source can then optionally pass through a reverse beam expander. The reverse beam expander can have a set number of lenses within the expander, which can narrow the beam width of the transmitted light. The light can then pass through an EWOD device lens (EWL), which can mitigate the effects of the focal length of the EWOD prism (EWP) changing based on the applied voltage. The light exits the EWL and enters the EWP. As discussed, the EWP can be used to change the light beam direction based upon applied voltage to the EWP sidewalls. Thus, the EWP can be attached to an electrical actuator, which can be controlled via a software or computer program discussed below.

The EWP acts as a scanner, scanning the light beam across at least one axis. In some cases, the axis can be a lateral axis, an axial axis, or a combination thereof. In some cases, the EWP acts as a slow scanner. The remaining axis can be scanned via a galvo mirror, which may act as a fast scanner in the system 200.

The light beam then exits the EWP and enters a relay lens subsystem. The relay lens subsystem can include a set of relay lenses, which are used to relay the light to the microscope. The microscope can include a scanning lens, which can translate the light beam into a position scanning beam. The position scanning beam then passes through a tube lens to a dichroic mirror. The dichroic mirror can filter the light beam, where the filtered light beam can then pass through an objective lens to the sample plane.

Light emitted from the sample plane can be beam split and filtered, and then passed to a set of detectors for generating an image based on the emitted light. The light source can be pulsated, while the EWP can be manipulated to beam steer the pulsated light, which providing for scanning in the lateral direction, the axial direction, or both. Thus, the system 200 provides for an EWOD-based high resolution microscope. Further, the EWOD can be manufactured to be used with various conventional high resolution microscopes, where the EWOD can be easily attached to and removed from the system 200. Thus the cost of manufacture is minimized, and allows for modular high resolution microscopy systems.

Exemplary High Resolution Microscopy System

Provided herein is an exemplary system for high resolution microscopy. The exemplary system is provided as an embodiment of the claimed invention. The EWOD prism in the system 200 can be an example of EWOD device 100 as described in FIG. 1.

The excitation source is a tunable mode-locked laser (e.g., Ti:Sapphire Spectra-Physics or Mai Tai HP DeepSee laser, etc.) with a specified pulse width (e.g., 90 fs) at a specified wavelength (e.g., 950 nm, etc.). The collimated output beam from the laser has a specified diameter at full width, half max (e.g., 1.43 mm, etc.), which can be decreased (e.g., to 0.91 mm diameter (FWHM)) using a reverse Galilean telescope consisting of a doublet lens (e.g., Thorlabs ACN254-040-B lens, etc.) with specified focal lengths (e.g., 40 mm, etc.) and a plano-convex lens (e.g., Thorlabs LA1608-B lens, etc.) with a specified focal length (e.g., 75 mm, etc.). The telescope is followed by a two-electrode EWOD prism, which provides steering, but also behaves as a diverging lens, with its focal length changing upon actuation. To mitigate the changing focal length, a variable focus EWOD lens (e.g., Arctic 316 Varioptic lens, etc.) is placed before the prism. The EWOD prism is actuated with a custom multi-channel linear amplifier controlled using a voltage output module (e.g., National Instruments NI-9264, etc.), and the EWOD lens is driven with a power supply (e.g., VPS-3 Varioptic power supply, etc.). The EWOD prism is used for beam scanning on one scan axis, while the other axis is scanned using a galvo mirror. The resulting scanned beam from the EWOD prism is relayed to a galvo mirror using a 1:1 telescope built using two achromatic doublets (Thorlabs AC254-125-B lens, etc.) with specified focal lengths (e.g., 125 mm, etc.).

The angle scanning beam is translated into position scanning using a scan lens (e.g., 50 mm Olympus scan lens, etc.). This position scanning beam is then imaged onto the sample plane with a microscope (e.g., Olympus IX71, etc.) composed of a tube lens (e.g., 180 mm tube lens, etc.) and an objective (Olympus 20x/0.75NA UPlanSApo objective, etc.).

After the tube lens, the excitation beam passes through a long pass dichroic (e.g., Chroma T670LPXR dichroic, etc.) with a specified wavelength cutoff e.g., at 670 nm, etc.) on its way to the objective. The two-photon excitation generated at the sample plane is then collected by the objective and reflected off the long pass dichroic and through a tube lens (e.g., 180 mm tube lens, etc.) to the input plane of detection optics. These optics collimate the emission beam with a specified focal length (e.g., 50 mm) achromatic doublet lens (e.g., Thorlabs AC254-50-A). The excitation light not fully removed by the first dichroic is further rejected with a specified cutoff (e.g., 785 nm, etc.) razor edge filter (e.g., Semrock filter). A dichroic filter (e.g., Semrock FF562-Di02) with a specified cutoff (e.g., at 562 nm) splits this beam enabling the capability to perform simultaneous dual detection of green and red fluorescent proteins, for example GCamp6 and tdTomato, eGFP and mCherry, etc. The green emission that is reflected off the dichroic is passed through a bandpass filter (e.g., 530/43 nm Semrock filter, etc.) and is focused with a lens (e.g., 25 mm focal length Thorlabs LB1761-A lens, etc.) onto a photomultiplier tube (PMT), while the red emission that is transmitted through the second dichroic is focused using a lens (e.g., 25 mm focal length Thorlabs LB1761-A lens, etc.) onto the second PMT. For example, both PMTs can be Hamamatsu H7422PA-40 PMTs with a 5 mm detector diameter. The output electrical pulses from the PMTs pass through high-bandwidth amplifiers (e.g., Becker & Hickl GmBH ACA-4-35 db amplifiers, etc.) and are converted to logic-level pulses by a timing discriminator (e.g., 6915, Phillips Scientific, etc.). The pukes are counted by a data-acquisition (DAQ) card (e.g., National Instruments PCIe-6259 DAQ card) at a specified rate (e.g., 20 MHz). The excitation and detection systems are integrated into a custom software system (e.g., National Instruments in Lab VIEW, etc.) to control the galvo-mirror and the EWOD prism, and sample and bin the PMT counts by pixels to convert them into an image.

Simulation and Results

Zemax optical design software was used to evaluate the effects of propagating a Gaussian beam through the EWOD prism in isolation from the rest of the optics in the imaging system. The Gaussian profile of a 950 nm pulsed beam with and without a Galilean telescope was first measured using a CCD camera (Mightex), and then fit to a Gaussian function.

Figure 3:
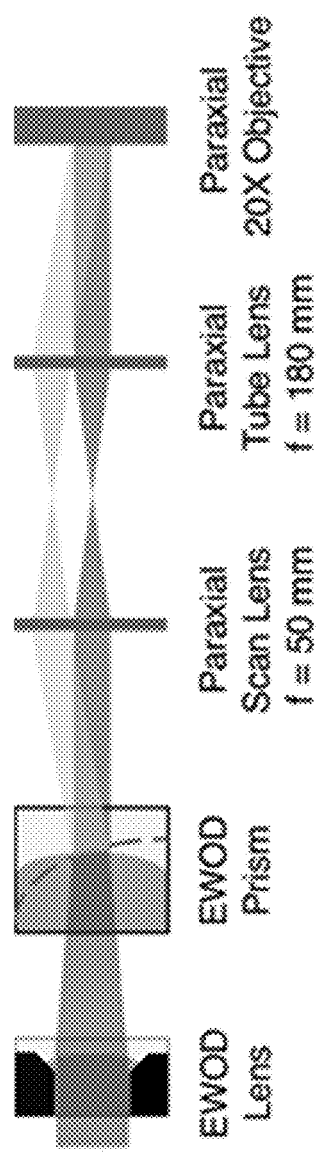
FIG. 3 depicts a simulation setup for scanning in high resolution fluorescent microscopy, according to an embodiment of the claimed invention.

The beam size (FWHM) without the Galilean telescope was 1.43 mm. When reduced in size by the telescope, the beam size (FWHM) was measured to be 0.91 mm. To minimize the influence of stray apertures and other optics, the galvo scanner and relay lenses were removed and the EWOD prism was placed at the back focal length of the scan lens. Further, the scan lens, tube lens, and objective lens were replaced by paraxial lenses with the same focal length. A schematic for the simulation setup 300 is shown in FIG. 3. The EWOD tunable lens was modeled using a Zemax model. The EWOD prism actuation surfaces were simulated in COMSOL Multiphysics using the Laminar two-phase flow module. The EWOD prism liquid-liquid interface surfaces were calculated as a function of applied voltage from 0V to 35V in 5V increments. The resulting surface meshes were fit to the first 11 Zernike polynomials, which were imported into Zemax as Zernike Fringe Sag surfaces at the EWOD prism liquid-liquid interface. The propagating Gaussian beam at the two beam sizes used in the experiments, as well as several other beam sizes, were modeled using the Physical Optics Propagation analysis tool and evaluated at the focus of the objective lens.

Figure 8:
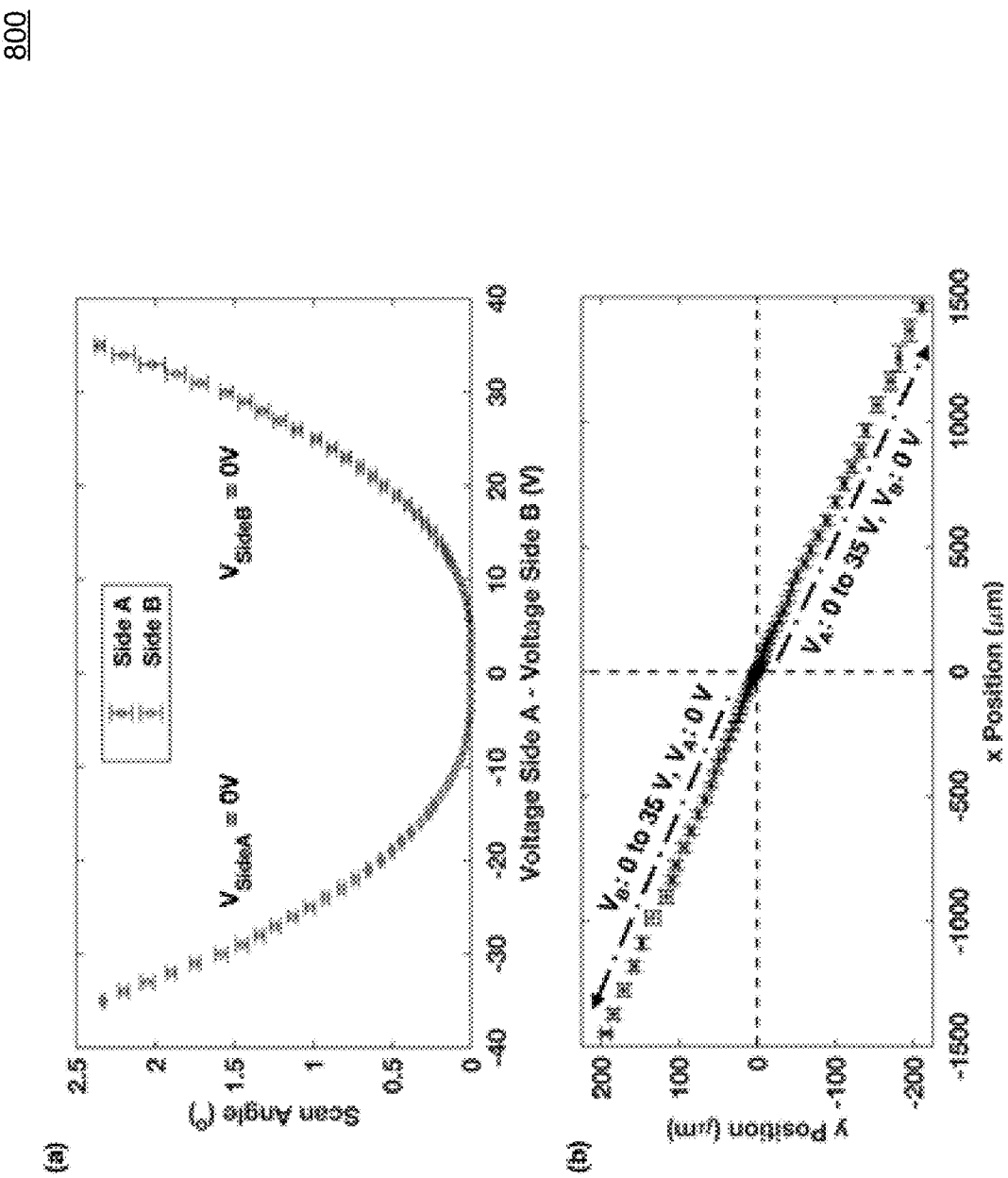
FIG. 8 depicts graphs of beam scanning for an EWOD device, according to an embodiment of the claimed invention.

The steady-state scan angle of the EWOD prism was first characterized as a function of applied voltage on each sidewall electrode. The scan angle variation with applied voltage is dependent on the refractive index ratio between the polar and non-polar liquids of the EWOD prism, that being dodecane and 1% SDS solution. While the refractive index of the liquids is dependent on wavelength, the ratio of the refractive index of the liquids increases by less than 0.5% between 650 nm and 950 nm wavelengths. This difference in the refractive index ratio would correspond to a less than 0.5% decrease in the scan angle. Hence, the scan angle characterization was performed using a 650 nm cw laser diode (Thorlabs L650P007). A beam with a 1 mm diameter (FWHM) was passed through the device and imaged onto a CCD camera (Dataray, WinCAMD-UCD12). Since the EWOD prism acts as a diverging lens, a commercially available tunable converging lens (Optotune EL-10-30) was placed before the EWOD prism to focus the beam spot on the CCD camera. The device was actuated by actuating each electrode from 0 to 35 V DC while keeping the other electrode at 0 V. The scan angle was calculated by monitoring the beam motion on the CCD camera with applied voltage. The scan angle experiments were performed with 5 independent runs to demonstrate device repeatability. The data in graph (a) of FIG. 8 shows ±2.35° of scanning from the device. Additionally, the position of the beam spot on the camera with voltage provides information on the straightness of the scan from the EWOD prism. Graph (b) of FIG. 8 shows the average beam spot location for all applied voltages for the 5 runs and as expected the scanning follows a straight line with an R-squared fit of 0.998. The error bars in both FIG. 8, graphs (a) and (b) correspond to a ±1 standard deviation of the measured results, indicating consistent scanning from the device.

The scan angle variation provides information on the steady-state scan angle vs. applied voltage. Based on this scan angle characterization, a time dependent voltage function of the form, $$V(t)=19.56 \cdot (\Theta(t))^{0.4949}+5$$

was fit to the experimental data in an effort to minimize the time dependent nonlinearity of the scan angle variation.

Figure 9:
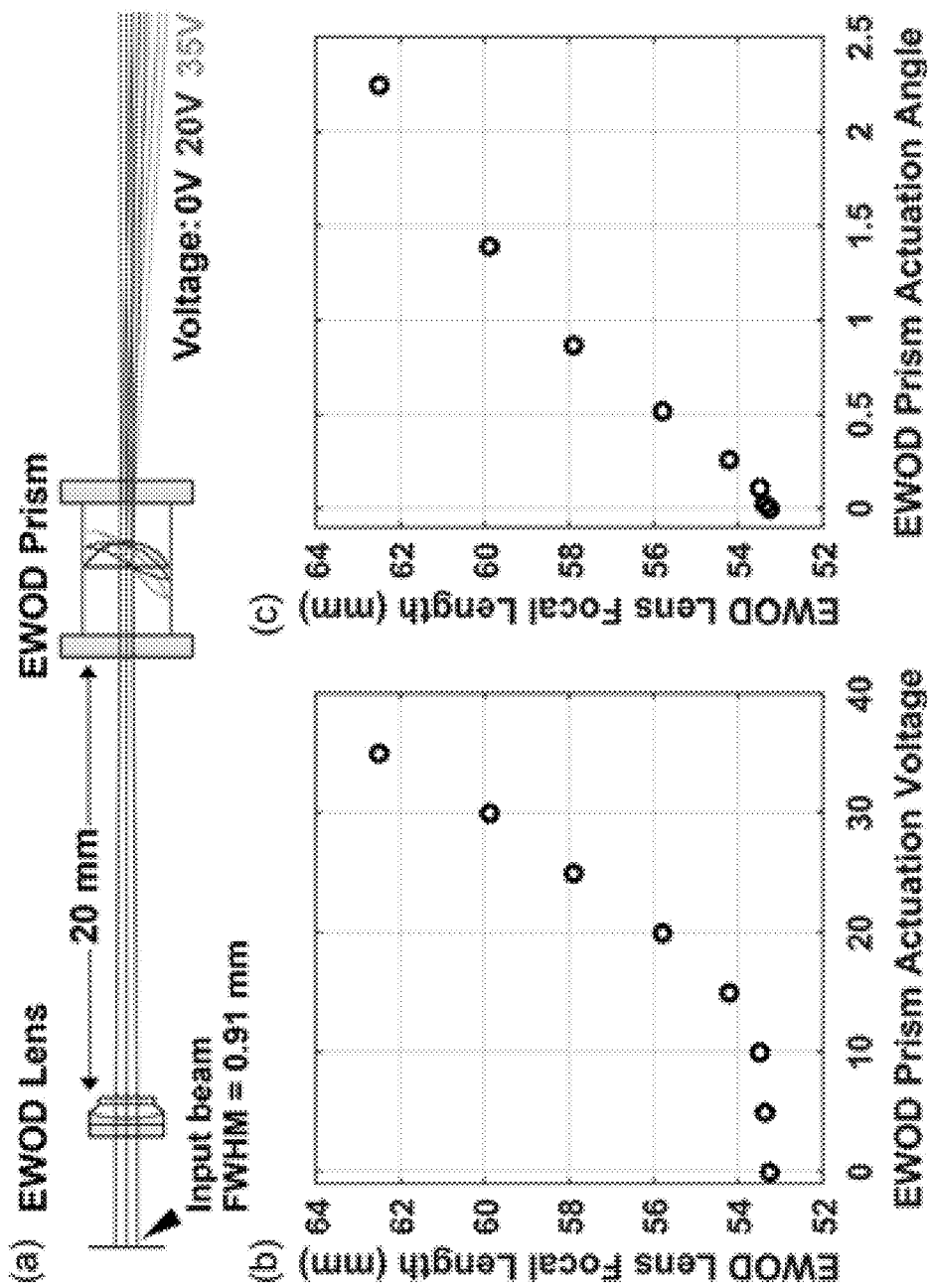
FIG. 9 depicts a model EWOD device and associated optical graphs, according to an embodiment of the claimed invention.

The EWOD prism was modeled in a simplified version of the experimental two-photon excitation imaging system to estimate the effects on the laser beam due to the varying surface curvature, and determine an optimal beam diameter for the imaging system. Additionally, the model was also used to simulate the change in focal length of the EWOD prism upon actuation using a Gaussian beam with a FWHM of 0.91 mm, replicating the experimental beam after the Galilean telescope. The Gaussian beam was evaluated at the front focal length of the objective and the focal length of the modeled EWOD lens was optimized to maximize the peak irradiance, indicating the tightest focus. Illustration (a) of FIG. 9 shows the modeled EWOD lens and EWOD prism system at various scan angles. Graph (b) of FIG. 9 shows the EWOD lens focal length needed to compensate for the shifting focal length of the EWOD prism as a function of voltage. Graph (c) of FIG. 9 shows the same plot, but as a function of actuation angle, indicating that the focal length shift of the EWOD prism is approximately linearly dependent on the actuation angle. Overall, these results estimate that the effective focal length of the simulated EWOD prism ranges from −53.2 mm at 0 V to −62.8 mm at 35 V.

Figure 10:
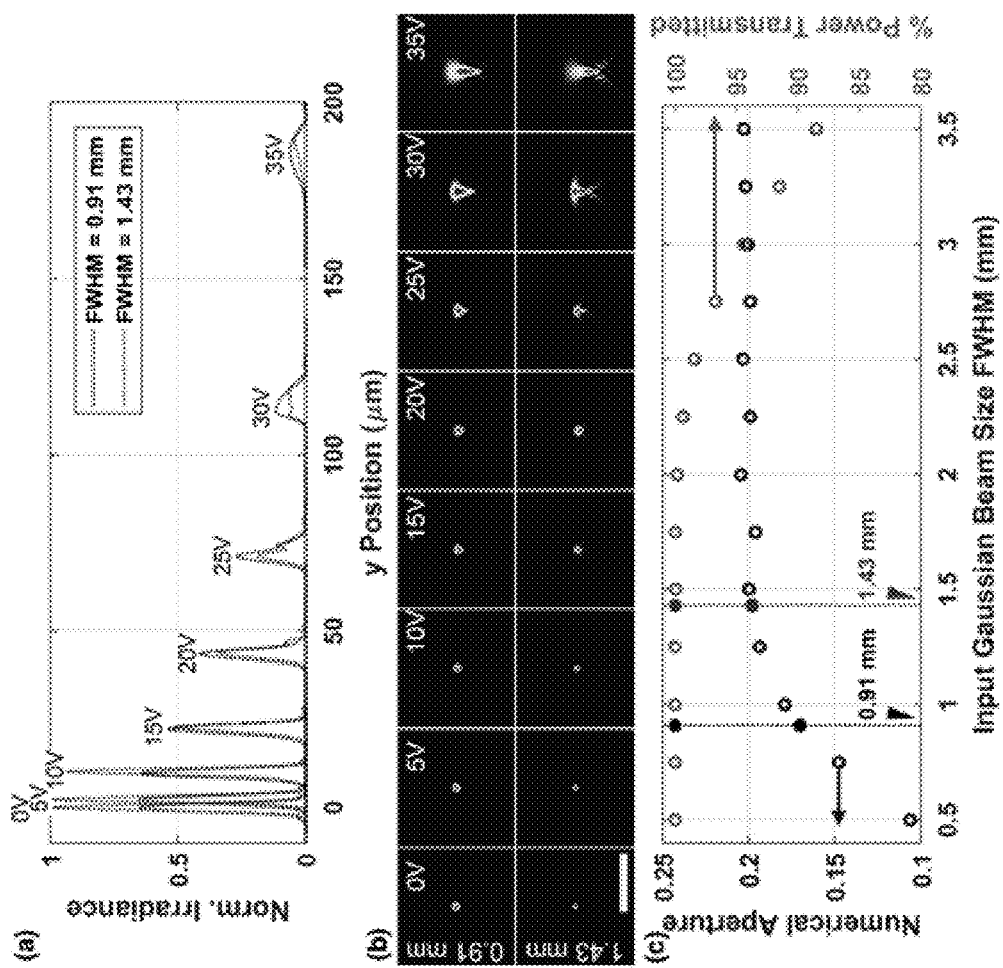
FIG. 10 depicts optical scanning graphs for an EWOD device, according to an embodiment of the claimed invention.

To evaluate the effect of the EWOD prism liquid-liquid interface and beam size on imaging quality, the system was modeled with Zemax optical design software. Graph (a) of FIG. 10 shows the cross-sections along the scanning axis of the focused Gaussian beam profiles as a function of lateral displacement. The normalized Y-axis maintains the relative peak irradiance of each Gaussian spot. The red-dashed lines show the focus from the larger beam (1.43 mm FWHM) without the Galilean telescope, and the black-dashed lines show the focus from the smaller beam (0.91 mm FWHM) reduced by the telescope. When compared to the smaller beam, the larger beam produces higher peak irradiance, a result of greater numerical aperture (NA) at the objective lens. However, the smaller beam performs better at higher scan angles. Graph (b) of FIG. 10 shows a more detailed two-dimensional profile of the Gaussian focus spots for the two beam sizes. The smaller beam (top) results in an overall large focus spot size at most scan angles, and becomes moderately distorted by astigmatic-like effects at higher EWOD voltages (e.g., >15V). In contrast, the larger beam is smaller and more tightly focused at lower actuation voltages, but at voltages >25V it accumulates more aberrations, reducing its peak intensity. This is a result of aberrations introduced by the EWOD prism surface at higher scan angles, and this effect is more evident for the larger beam (1.43 mm FWHM) when compared to the smaller beam (0.91 mm FWHM). Graph (c) of FIG. 10 shows the results of propagating beams of increasing diameter, up to 3.5 mm FWHM. Up to 2 mm, there is less than 1% loss of transmitted power (right axis) due to clipping or other vignetting. However, the expected increase in imaging NA (left axis, blue) with beam size is halted at ~1.4 mm FWHM. This result suggests that the loss in imaging performance at high scan angles is not due to loss of transmitted power but is likely due to the accumulation of aberrations. These effects are more pronounced as the size of the input beam is increased. Based on these results, the imaging experiments were conducted with the Galilean telescope included in the system resulting in a beam with FWHM of 0.91 mm, resulting in a NA of 0.17 while maintaining a usable scan range of ~130 μm through the system.

The voltage function shown discussed above was used to actuate the side-electrodes of the model EWOD prism. While the function is determined using the steady state scan angle variation of the device, the scan angle variation still has some small time-dependent nonlinearity. This can be attributed to the time-dependent response of the EWOD prism upon actuation and an actuation delay introduced by the RC characteristics of the EWOD device. Upon integration with the two-photon excitation microscope, a scan range of ±2° was obtained as a result of the physical implementation of the EWOD prism device.

Figure 11:
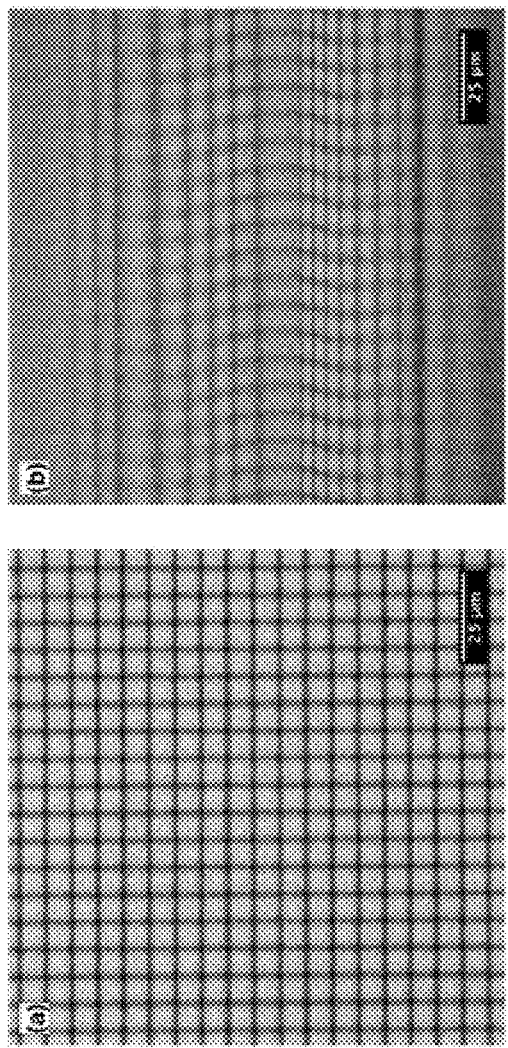
FIG. 11 depicts grid calibration images and an associated voltage function graph, according to an embodiment of the claimed invention.
Figure 11:
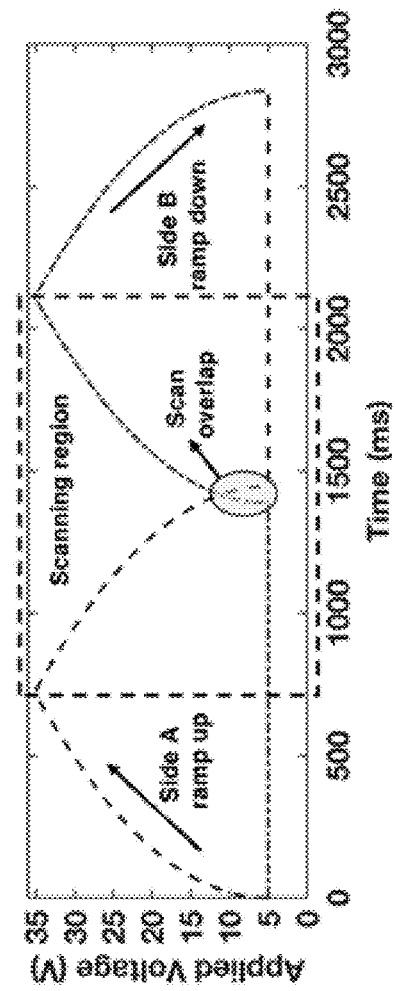

In order to characterize this time-dependent scan angle nonlinearity of the device upon actuation with the voltage fit function, an image of a calibration grid target with a 7.5 μm grid spacing was obtained using the microscope. The calibration grid image was first taken, using conventional two-axis galvo scan mirrors with the EWOD prism in the path of the beam and actuation voltage set to V=0 V. The EWOD lens, placed before the prism, was actuated at 44.5 V in order to compensate for the divergence of the EWOD prism and collimate the beam. Image (a) of FIG. 11 depicts a reference for calibrating the grid image with the EWOD prism. The reference calibration grid image was obtained at a resolution of 512×512 pixels with a dwell time of 10 μsec per pixel. An image of the calibration grid was then obtained by replacing one of the galvo mirror actuation axes with the EWOD prism (as shown in image (b) of FIG. 11), while keeping the pixel count and dwell time per pixel consistent with the reference calibration grid image. In this configuration, the EWOD prism serves as the slow axis scanner while the operational galvo mirror is used as the fast axis scanner for performing the raster scanning. The galvo mirror actuation range is set to ±2V (corresponding to ±2°) to match the scan range of the EWOD prism in the imaging system. The EWOD prism is actuated by applying the voltage function discussed above on the side-electrodes alternately with θ(t) linearly varying from between 0° to 2.35°. The scanning function starts with the first side-electrode at 35 V and the second side-electrode at 5V, and ends with the second side-electrode at 35 V and the first side-electrode at 5V. For this purpose, gradual ramp up and ramp down functions are included in the function to avoid oscillations at the liquid-liquid interface due to sudden actuation. The actuation voltage functions on the two side-electrodes are slightly overlapped at the transition in order to compensate for the time delay introduced by the RC characteristics of the device. A plot of the applied voltage function is shown in graph (c) of FIG. 11.

Importantly, the curvature of the liquid-liquid interface changes upon actuation, causing the focal point of the objective to shift axially. To compensate for this effect, multiple scans were performed while reducing the EWOD lens actuation voltage 46.4V to 42.6V in steps of 0.2V per scan. The EWOD lens actuation voltage range from 42.6V to 46.4V covers the entire range of focal length shift (−63.2 mm to −52.8 mm) caused by the EWOD prism actuation. Using this technique, the regions in focus are resolved, leading to a stack of images with different parts of the target imaged depending on the focus of the system. Finally, the image of the target is constructed by taking z projection of the stack.

Figure 12:
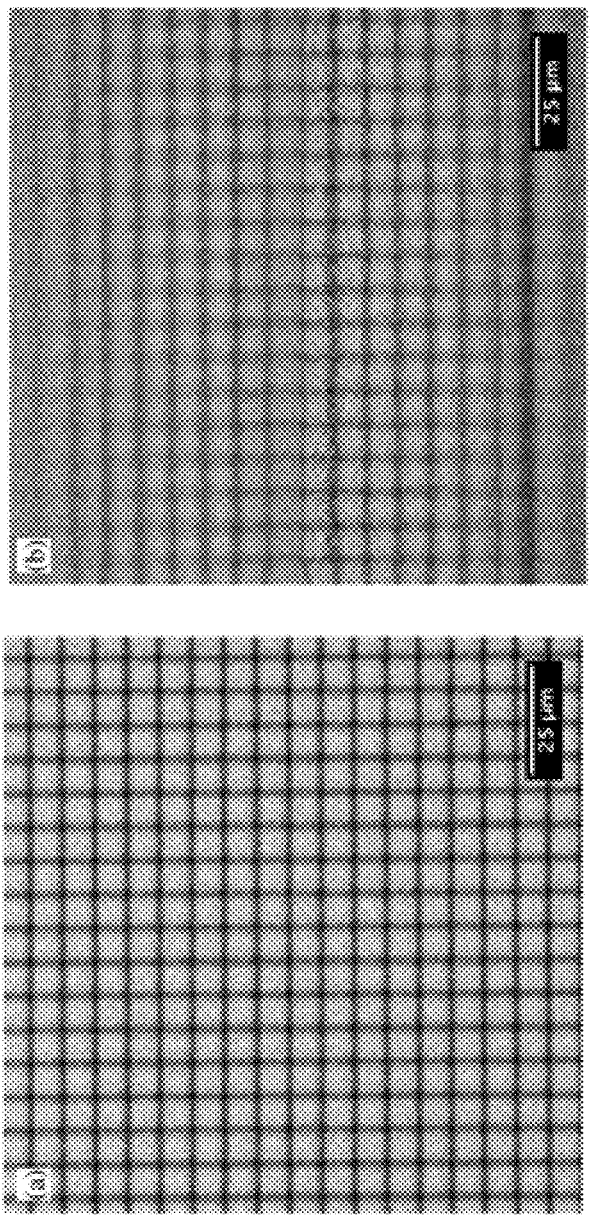
FIG. 12 depicts calibrated images from an EWOD device, according to an embodiment of the claimed invention.

The warping in the image acquired by EWOD prism scanning can be corrected by applying a distortion correction matrix to the warped image. In order to generate the distortion correction matrix, the grid intersection points in both the reference grid image and the EWOD scanning image were first registered using the descriptor-based registration plugin in ImageJ software. The coordinates of these intersection points were correlated between the images, and to map the intersection points from the EWOD prism scan to the reference image, a spline interpolant mapping function was determined. To correct for the image warping, the mapping function was then used to construct a transformation matrix in MATLAB, and applied to the grid image acquired using EWOD prism scan. FIG. 12 shows the results 1200 from this image transformation. This transformation matrix serves as the basis for correcting for distortions in the 2PE images of fixed neuron cells.

Two-Photon Imaging of Hippocampus Neuron Cells

Figure 13:
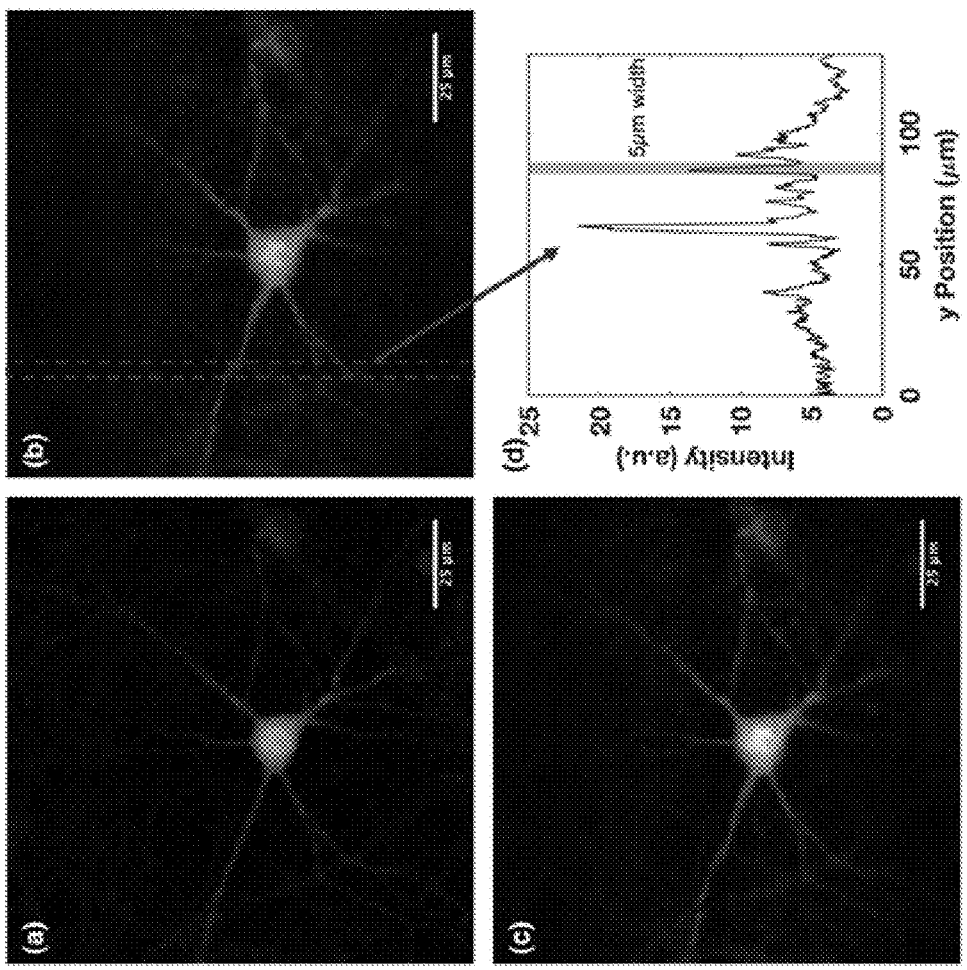
FIG. 13 depicts cell image results for an EWOD device, according to an embodiment of the claimed invention.

To demonstrate raster scanning for two-photon excitation imaging of neurons, in vitro cultured mice hippocampus neurons labeled with enhanced green fluorescent proteins (eGFP) were used. The cultured cells were fixed with 4% paraformaldehyde and mounted on a glass slide to obtain a thin sample of cells for 2PE microscopy. The imaging was performed using single channel PMT detection corresponding to the emission from green fluorescent proteins. The same image acquisition protocol as the target grid pattern as described above was used to image the neurons. A reference image was acquired using galvo scanners prior to acquiring the cell image with the EWOD prism replacing one of the galvo mirrors as the slow axis scanner. Both the reference and EWOD prism scan images were acquired at an average laser input power of 9 mW at a resolution of 512×512 pixels with 10 μs dwell time per pixel. The focal length shift with the EWOD actuation is corrected passively by performing multiple scans with EWOD lens actuation voltage reduced from 46.4V to 42.6V in steps of 0.2V per scan, generating a stack of images containing different regions of the cell imaged while in focus. Due to enhanced sensitivity of two-photon excitation at the focal point, individual images of the stacks produced are nearly free of background noise, and a maximum intensity projection of the image stack produces sharp image comparable to the quality of the image acquired using conventional galvo scanners. The images acquired using the EWOD prism are then corrected using the transformation matrix obtained from the grid target images. FIG. 13 shows results of the cell images acquired using the EWOD prism scanning after distortion correction, and the reference image obtained using galvo scanners. It is evident from image (c) that the image collected using EWOD prism scan upon distortion correction (image (b)) resembles the reference image collected using the galvo scan (image (a)) and that the cell shape is preserved on the EWOD prism scan image. Graph (d) of FIG. 13 is a graph of image intensity cross section along the y-direction obtained in image (b).

In addition to the cell body, the high-resolution images captured the fluorescence expression from dendrites with width of the order of 5 μm. Images can be acquired faster using the EWOD prism scan by reducing the pixel count and dwell time for the scan. EWOD prism actuation of as fast as 21°/sec could be used to obtain lower resolution images. This actuation speed can be further improved by using techniques like voltage shaping or resonance mode scanning, to reduce the scan time and implementation for fast axis scanning.

The image shown in image (b) of FIG. 13, acquired using the EWOD prism scanning indicates that the imaging system has a field of view (FOV) of 130×130 μm$^2$. This FOV is obtained using an input beam with a FWHM of 0.91 mm. The FOV of the imaging setup can be further enhanced by increasing the scan angle range of the EWOD prism by using a liquid system with a higher refractive index contrast. A higher resolution two-photon excitation microscope image with a lower scan range can be acquired through this system by using a larger beam (1.43 mm FWHM). Also, the limitation imposed by aberrations through the EWOD prism on the scan range and the imaging quality can be decreased by either increasing the number of electrodes on the device resulting in a planar fluidic interface upon actuation, or with careful optical design incorporating wide angle steering optics to enhance the scan range in the region where the effects of aberrations through the device are not pronounced.

Software

Software programming code, in particular code related to controlling the actuator of the systems and the generation of fluorescence imaging of the systems described herein, is typically stored in permanent storage. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A system for high resolution multiphoton excitation microscopy, the system comprising:
   an electrowetting on dielectric (EWOD) prism optically coupled to an excitation source, the EWOD prism adapted or configured to:
   receive a light beam from the excitation source; and
   project the received light beam onto a sample plane based on a tunable transmission angle of the EWOD prism and according to a steady-state scan angle characterized by at least an applied voltage to each electrode of the EWOD prism; and
   a fluorescence imaging microscope adapted or configured to:
   receive a fluorescence signal from the sample plane based on the projected light beam; and
   relay the fluorescence signal from the sample plane to a set of detectors;
   wherein the projecting the received light beam onto a sample plane is further according to a time dependent voltage function performing a time dependent scan on a sample of the sample plane.

2. The system of claim 1, wherein the EWOD prism further comprises:
   a cylindrical tube;
   at least a first electrode positioned on a first inner portion of the cylindrical tube; and
   at least a second electrode positioned on a second inner portion of the cylindrical tube; wherein the at least first electrode and the at least second electrode are separated from one another based on a shadow masking process.

3. The system of claim 2, wherein the EWOD prism further comprises:
   a mount coupled to the cylindrical tube; where the mount and the cylindrical tube define a cavity; and
   a liquid solution located within the cavity of the cylindrical tube and the mount.

4. The system of claim 3, wherein the liquid solution further comprises at least one of a sodium dodecyl sulfate solution, dodecane, deionized water, 1-phenyl-1-cyclohexene, 1,8 Dibromoctane (DBO), Diphenyltetramethyldisiloxane (DPTMDS), ECO-704 diffusion pump oil, or a combination thereof.

5. The system of claim 1, further comprising:
   a power supply coupled to the EWOD prism, the power supply adapted or configured to generate a voltage difference across the EWOD prism; wherein the generated voltage difference alters the angle of transmission of the EWOD prism.

6. The system of claim 1, wherein the fluorescence imaging microscope further comprises a fiber-coupled microendoscope or a fiber-coupled two-photon excitation microscope.

7. The system of claim 1, wherein the EWOD prism is further adapted or configured to steer the light beam in at least one of a lateral scanning configuration, an axial scanning configuration, or a combination thereof.

8. The system of claim 1, wherein the EWOD prism is further adapted or configured to be removable and attachable to the fluorescence imaging microscope.

9. The system of claim 1, wherein the set of detectors are adapted or configured to generate a fluorescent image of a sample on the sample plane based on the fluorescent signal from the sample.

10. The system of claim 1, wherein the generated fluorescent image comprises an image portion of red fluorescent proteins, an image portion of green fluorescent proteins, an image portion of yellow fluorescent proteins, or a combination thereof.

11. A system for fabricating the EWOD prism as described in claim 1, the system comprising:
    a high resolution printer adapted for configured to generate a shadow mask; wherein the shadow mask is adapted or configured to mask a portion of a cylindrical tube prior to a depositing of a set of electrodes onto a set of sidewalls of the EWOD prism.

12. The system of claim 11, further comprising:
    a depositor adapted or configured to deposit the set of electrodes onto the set of sidewalls of the EWOD prism.

13. The system of claim 12, wherein the depositor deposits the set of electrodes via at least one of a direct current (DC) sputtering process, a radio frequency (RF) sputtering process, a chemical vapor deposition (CVD) process, an atomic layer deposition (ALD) process, or a combination thereof.

14. The system of claim 1, wherein the EWOD prism includes a volume of liquid consisting of deionized water, 1-phenyl-1-cyclohexene and dodecane.

15. A system for high resolution multiphoton excitation microscopy, the system comprising:
   an electrowetting on dielectric (EWOD) prism including a volume of liquid consisting of deionized water, 1-phenyl-1-cyclohexene and dodecane, and optically coupled to an excitation source, the EWOD prism adapted or configured to:
      receive a light beam from the excitation source; and
      project the received light beam onto a sample plane based on a tunable transmission angle of the EWOD prism and according to a steady-state scan angle characterized by at least an applied voltage to each electrode of the EWOD prism; and
   a fluorescence imaging microscope adapted or configured to:
      receive a fluorescence signal from the sample plane based on the projected light beam; and
      relay the fluorescence signal from the sample plane to a set of detectors.

16. The system of claim 15, wherein the EWOD prism further comprises:
   a cylindrical tube;
   at least a first electrode positioned on a first inner portion of the cylindrical tube; and
   at least a second electrode positioned on a second inner portion of the cylindrical tube; wherein the at least first electrode and the at least second electrode are separated from one another based on a shadow masking process.

17. The system of claim 16, wherein the EWOD prism further comprises:
   a mount coupled to the cylindrical tube; where the mount and the cylindrical tube define a cavity; and
   wherein the volume of liquid is located within the cavity of the cylindrical tube and the mount.

18. The system of claim 15, further comprising:
   a power supply coupled to the EWOD prism, the power supply adapted or configured to generate a voltage difference across the EWOD prism; wherein the generated voltage difference alters the angle of transmission of the EWOD prism.

19. The system of claim 15, wherein the fluorescence imaging microscope further comprises a fiber-coupled microendoscope or a fiber-coupled two-photon excitation microscope.

20. The system of claim 15, wherein the EWOD prism is further adapted or configured to steer the light beam in at least one of a lateral scanning configuration, an axial scanning configuration, or a combination thereof.

* * * * *